(12) United States Patent
Fliegl (10) Patent No.: US 9,663,011 B2
(45) Date of Patent: May 30, 2017

(54) SLIDING WALL SYSTEM, STORAGE SPACE STRUCTURE AND VEHICLE

(71) Applicant: Fliegl Agrartechnik GmbH, Mühldorf am Inn (DE)

(72) Inventor: Josef Fliegl, Mühldorf (DE)

(73) Assignee: Fliegl Agrartechnik GmbH (DE)

( * ) Notice: Subject to any disclaimer, the term of this patent is extended or adjusted under 35 U.S.C. 154(b) by 0 days.

(21) Appl. No.: 14/920,096

(22) Filed: Oct. 22, 2015

(65) Prior Publication Data

US 2016/0121775 A1 May 5, 2016

(30) Foreign Application Priority Data

Nov. 5, 2014 (DE) .................... 20 2014 105 316 U (51) Int. Cl.
*B60P 1/36* (2006.01)
*B60P 1/00* (2006.01)

(52) U.S. Cl.
CPC .............. *B60P 1/006* (2013.01); *B60P 1/365* (2013.01)

(58) Field of Classification Search
USPC ............. 414/513, 514, 516, 517, 521, 525.6
See application file for complete search history.

(56) References Cited

U.S. PATENT DOCUMENTS

| | | | | |
|---|---|---|---|---|
| 2,318,886 A | * | 5/1943 | Paiement | B60P 1/365 37/432 |
| 2,505,009 A | * | 4/1950 | Schroeder | B66F 9/08 187/229 |
| 2,530,350 A | * | 11/1950 | Ehlert | A01D 90/10 414/516 |
| 4,002,272 A | * | 1/1977 | Crawford | A01C 3/066 222/262 |
| 4,395,189 A | * | 7/1983 | Munten | B66F 9/08 187/234 |
| 6,837,668 B1 | * | 1/2005 | Brown | B60P 1/365 414/510 |
| 8,647,044 B2 | * | 2/2014 | Stewart | B60P 1/365 414/510 |
| 2014/0037408 A1 | * | 2/2014 | Ward | B65G 67/22 414/338 |
| 2014/0219755 A1 | * | 8/2014 | Lambert | B60P 1/006 414/516 |

FOREIGN PATENT DOCUMENTS

| | | |
|---|---|---|
| DE | 202004009744 U1 | 8/2004 |
| DE | 60102731 T2 | 3/2005 |
| DE | 202014102305 U1 | 7/2014 |
| EP | 0685360 A1 | 12/1995 |
| EP | 1208736 A1 | 5/2002 |
| JP | 59-30762 * | 9/1984 ................ B60P 1/36 |

* cited by examiner

*Primary Examiner* — Michael McCullough
*Assistant Examiner* — Mark Hageman
(74) *Attorney, Agent, or Firm* — Renner Kenner Greive Bobak Taylor & Weber (57) ABSTRACT

A sliding wall system for a storage space structure having a guide, a sliding wall and a drive for displacing the sliding wall along the guide, the drive including a drive cylinder, and a movement of a movable portion of the drive cylinder in a first movement direction is transmitted to the sliding wall via a first pulling means, and a movement of the movable portion of the drive cylinder in a second movement direction is transmitted to the sliding wall via a second pulling means.

10 Claims, 8 Drawing Sheets

SLIDING WALL SYSTEM, STORAGE SPACE STRUCTURE AND VEHICLE

TECHNICAL FIELD

The invention relates to a sliding wall system, a storage space structure having such a sliding wall system and a vehicle having such a storage space structure.

BACKGROUND OF THE INVENTION

In particular from the agricultural and forestry sector, there are known vehicles which have storage space structures which comprise a sliding wall system. The displacement of a wall of the sliding wall system serves to temporarily reduce the storage space which is limited at one side of the wall in order to either unload cargo stored in the storage space via an unloading opening which is generally opposite the displaceable wall or to compact the cargo when the storage space is fully closed.

A vehicle in the form of a trailer having such a storage space structure is known, for example, from DE 20 2004 009 744 U1. In this instance, the storage space which is open in an upward direction is delimited by a storage space floor, a movable end wall, a rear wall which is intended to be opened by being folded upwards and two side walls. The storage space floor is partially formed by a main floor which is integrated in a non-movable manner in the storage space structure and a sliding floor whose length (in the direction of displaceability of the end wall) is substantially half the largest spacing between the displaceable end wall and the rear wall and which can be displaced by means of a drive in the form of a hydraulic cylinder. A displacement of the end wall relative to the rear wall or relative to the unloading opening which can be released by the rear wall is carried out by displacing the sliding floor including the end wall on the main floor and/or displacing the end wall on the sliding floor, wherein, for the most extensive possible displacement of the end wall in the direction of the unloading opening, both the sliding floor has to be displaced on the main floor and the end wall has to be displaced on the sliding floor.

For the displacement of the end wall on the sliding floor, there is provided a drive which is connected to the end wall at the side facing away from the storage space and which is consequently moved therewith. This drive cooperates with a pulling means in the form of a chain which extends in a channel which is formed by the sliding floor at the side of the sliding floor facing away from the storage space in the movement directions of the end wall. The channel which receives the chain is provided with an opening which extends in the longitudinal direction thereof and through which the respective chain portion, which is guided depending on the relative position of the end wall on the sliding floor via a plurality of redirecting toothed wheels of the drive, extends out of the channel.

A webbing serves to cover the opening of the channel in order to prevent introduction of cargo which is stored in the storage space. To this end, the webbing is positioned, in those portions of the channel in which the chain is guided within the channel, on the channel and closes the opening accordingly. In contrast, in the region of the drive in which the chain is guided out of the channel, the webbing is lifted via a roller arrangement from the channel and guided via the redirecting toothed wheels of the drive. In order to ensure a reliable positioning of the webbing which is unstable per se on the channel, a clamping device is provided for the webbing.

A trailer having a storage space structure with a sliding wall system is also known from DE 20 2014 102 305 U1. In this storage space structure, the rotary drive, by means of which the movement of the sliding wall can be brought about, is integrated in the storage space structure in a stationary manner, wherein a drive movement of the rotary drive is transmitted to the sliding wall via a pulling means. In this instance, the rotary drive is arranged at one end of the storage space structure and a redirection roller at the other end of the storage space structure. The pulling means, whose two ends are secured to the sliding wall, is guided via both the redirection roller and the drive wheel of the rotary drive, which wheel also further acts as a redirection member. By means of an operation of the rotary drive in two directions of rotation, a movement of the sliding wall in both movement directions can consequently be produced by means of a single pulling means drive. In that portion which, in the context of the possible movement of the sliding wall, is guided via the drive wheel of the rotary drive, the pulling means is constructed as a chain so that the drive power of the rotary drive can be transmitted in a slip-free manner to the pulling means. In contrast, in another portion, the pulling means is constructed as a cable.

SUMMARY OF THE INVENTION

Based on this prior art, an object of the invention is to provide a sliding wall system for a storage space structure of a vehicle, which enables high displacement capacities for the sliding wall to be produced in a structurally advantageous and cost-effective manner.

This object is achieved by means of a sliding wall system according to claim 1. A storage space structure having such a sliding wall system is the subject-matter of claim 11. A vehicle which comprises such a storage space structure is the subject-matter of claim 15. Advantageous embodiments of the sliding wall system according to the invention and consequently the storage space structure and/or vehicle according to the invention are the subject-matter of the additional claims and will be appreciated from the following description of the invention.

The invention is based on the notion that hydraulic or pneumatic drive cylinders are distinguished by a low power to weight ratio and—in comparison in particular with hydraulic or pneumatic rotary drives having a comparable power—by low costs. Such a drive cylinder could accordingly advantageously be used for producing the forces which bring about a displacement of the sliding wall. A disadvantage when using a drive cylinder is, however, the comparatively small stroke, or the overall length thereof which is large in comparison with the stroke which can be achieved. According to the invention, this disadvantage is compensated for by the driving of the sliding wall being carried out only indirectly by means of the drive cylinder by the movements of the movable portion of the drive cylinder being transmitted to the sliding wall by means of pulling means. In this instance, a redirection of the pulling means advantageously enables the production of a translation which is less than one, in which a movement of the movable portion of the drive cylinder by a defined travel path leads to a movement of the sliding wall by a travel path which is greater than the defined travel path. In this instance (since it is adequate and can be readily produced), a translation of ½ may be advantageous since then the overall length of the drive cylinder in the completely extended state is only slightly longer than the maximum provided displacement path for the sliding wall. The drive cylinder may accordingly be integrated in the storage space structure, without it significantly projecting beyond a storage space which is delimited at one side by the sliding wall.

Accordingly, a sliding wall system for a storage space structure which comprises at least a guide, a sliding wall and a drive for displacing the sliding wall along the guide is characterised in that the drive comprises a (preferably hydraulic or pneumatic) drive cylinder, wherein a movement of a movable portion (in particular the piston rod) of the drive cylinder in a first movement direction is transmitted to the sliding wall via a first pulling means and a movement of the movable portion of the drive cylinder in a second movement direction is transmitted to the sliding wall via a second pulling means.

A storage space structure according to the invention comprises, in addition to such a sliding wall system, at least one additional floor, wherein the sliding wall can be displaced along the floor. Preferably, the storage space structure may further have at least one additional wall (side wall, roof wall), along which the sliding wall can also be displaced. There may also be provision for the sliding wall to be able to be displaced in the direction of an unloading opening, which enables advantageous unloading of the storage space delimited by the sliding wall and the floor and optionally the additional walls by means of the sliding wall.

A storage space which is formed by the storage space structure is preferably delimited by the sliding wall and the additional wall(s). In a particularly preferred manner, a delimitation which is at least laterally fully extensive (that is to say, only open in an upward direction) is provided by means of walls, wherein, in a further preferred manner, at least one of the walls, in particular the one which is opposite the displaceable wall, can be opened in order to release the unloading opening. Preferably, the displaceable wall is an end wall which is located at the rear or (in a particularly preferred manner) at the front in the travel direction of a vehicle which is provided with the storage space structure. However, it is also possible to form at least one side wall as a sliding wall.

In a preferred embodiment of the sliding wall system according to the invention, there may be provision for one end of the first pulling means to be secured to the sliding wall and the other end to be secured to the guide, wherein the pulling means is guided (in particular exclusively) via a redirection member (in particular a redirection roller) which is arranged on the movable portion of the drive cylinder. As a result of this configuration and guiding of the first pulling means, a translation of the corresponding stroke movement of the movable portion of the drive cylinder with respect to the sliding wall of ½ can be produced using a pulling means which is as short as possible. This may be particularly advantageous when, with a movement of the movable portion of the drive cylinder, which is transmitted by means of the first pulling means to the sliding wall, the sliding wall is displaced in the direction of an unloading opening of the storage space structure. This is because, to this end, significantly greater forces are generally required than for a movement in the opposite movement direction. A pulling means which is as short as possible limits to an appropriate extent the lengthening of this first pulling means brought about by the forces, which may have a positive effect on the maximum displacement path which can actually be achieved for the sliding wall and/or on the directness of the transmission of the movement of the movable portion of the drive cylinder to the sliding wall.

On the other hand, the second pulling means may preferably be guided via two redirection members (in particular redirection rollers) which are arranged outside the displacement range of the sliding wall, wherein the second pulling means is further secured to the sliding wall and guided via a redirection member which is arranged on the movable portion of the drive cylinder or is secured to the movable portion of the drive cylinder and guided via a redirection member which is arranged on the sliding wall. As a result of this configuration and guiding of the second pulling means, it is in turn possible to produce a translation of the corresponding stroke movement of the movable portion of the drive cylinder with respect to the sliding wall of ½. At the same time, this results in the active direction (that is to say, the transmission of the associated movement of the movable portion of the drive cylinder to the corresponding movement of the sliding wall) of the second pulling means being opposed to that of the first pulling means, wherein additionally the pulling means which is not active in each case, in spite of a currently non-occurring transmission of tensile forces, is tracked or held under tension.

Preferably, there may be provision, in the event of a transmission of a movement of the movable portion of the drive cylinder to the sliding wall by means of the second pulling means, for the sliding wall to be moved away from the unloading opening. Since, in this instance, only small forces are generally required in order to move the sliding wall, the relatively great length of the second pulling means, which results from the multiple redirection which is preferably provided, is generally not a problem with regard to excessive lengthening of the second pulling means.

For the same reason, there may also advantageously be provision for the second pulling means to be constructed in a cost-effective manner as a cable. The use of a cable may additionally afford the advantage of a relatively low weight and low operating noises. The first pulling means, by means of which significantly higher tensile forces are transmitted where applicable, may in contrast advantageously be constructed as a chain, which in comparison with a cable can be better constructed with respect to low expansion at high tensile forces and good capacity for redirection. In principle, however, each of the pulling means may be constructed as a cable or a chain.

An embodiment of the sliding system according to the invention which is advantageous with respect to the construction space which is required may make provision for all of the strands formed by the first and second pulling means to extend substantially coaxially or parallel with a longitudinal axis of the drive cylinder. This enables in particular the entire drive train to be arranged parallel with the displacement range for the sliding wall, whereby advantageously the great longitudinal extent of the storage space delimited by the storage space structure can be used for the arrangement of the drive train.

An embodiment of the sliding wall system according to the invention in which the first pulling means and the second pulling means extend in planes which are arranged in a parallel manner (spaced apart) may also be found to be advantageous with respect to the structural space required. In particular, conflicting structural space requirements for the at least two pulling means can thereby be prevented.

In a particularly preferred manner, there may be provision for (at least) two first pulling means and a second pulling means to be provided, wherein the second pulling means is arranged with respect to the direction transverse relative to the movement directions of the sliding wall between these first two pulling means. As a result of the use of more than a first pulling means, the lengthening thereof can be kept small. A symmetrical arrangement of the second pulling means between two first pulling means additionally promotes the most symmetrical possible force transmission from the drive cylinder to the sliding wall via the respective pulling means without resulting in structural space conflicts when accommodating the pulling means.

In order to prevent idle paths for the movable portion of the drive cylinder, a (respective) clamping device may preferably be provided for the first pulling means and/or the second pulling means. As a result, the pulling means can be pretensioned so that a movement of the movable portion of the drive cylinder is transmitted in the most direct manner possible to the sliding wall. Such a clamping device may, for example, be constructed as a simple resilient element, in particular a helical spring or a threaded anchor.

In a further preferred embodiment of the sliding wall system according to the invention, there may additionally be provision for the guide to be constructed as a guiding channel and for the drive cylinder, the first pulling means and/or the second pulling means to be arranged at least partially inside the guiding channel. The drive train can thereby effectively be protected from the introduction of contamination. In addition, this advantageously enables the construction of the sliding wall system as a unit which can be individually handled. It can thereby, on the one hand, advantageously be mounted on a structure in order to form a storage space structure according to the invention. To this end, a lower side of the guiding channel of the sliding wall system may, for example, be placed on the floor of the structure and fixed at that location (for example, screwed). In particular, this also enables the storage space structure to be constructed, if necessary, with a sliding wall or without a sliding wall on the same or an identical base structure, for example, by a stationary wall (in place of the sliding wall) being able to be mounted as an alternative to a sliding wall system according to the invention.

In order to protect the drive train in the best possible manner with respect to contamination, there may advantageously be provision for it to be arranged outside the storage space which is (where applicable inter alia) delimited by the sliding wall. In this embodiment of the sliding wall system with a drive train arranged inside a guiding channel, the guiding channel is intended to advantageously be constructed to be closed at least with respect to the storage space, in a particularly preferred manner to the greatest possible extent (in particular fully extensively) in order to prevent the introduction of contamination. In this instance, however, the transmission of forces from the drive train to the sliding wall has to be ensured, which is preferably carried out mechanically by means of a securing portion. Accordingly, there may be provision for the guide to have a guiding slot, wherein the securing portion for the sliding wall extends through the guiding slot, wherein the first pulling means and the second pulling means engage on the securing portion at the side of a guiding face facing away from the sliding wall.

In order to prevent the introduction of contamination into the guiding slot and consequently where applicable into the inner space of the guide which is constructed as a guiding channel, which could lead to a corresponding contamination of the drive train, there may preferably be provision for the guiding slot to be sealed to the best possible extent wherever the securing portion of the sliding wall is not guided in a linear manner through the guiding slot. To this end, there may advantageously be provision for the guiding slot to be formed between the guiding face which is constructed as a resiliently deformable cover and another element of the guide, wherein the cover is locally lifted from the other element by the securing portion. A suitable covering for a storage space structure according to the invention may be constructed in a cost-effective manner from a metal sheet, in particular a steel sheet. Such a cover is also distinguished by a relatively good wear-resistance. It is also possible to construct the cover from plastics material or any other resilient materials.

In order to prevent the cover from being locally lifted inside the storage space which is (also) delimited by the sliding wall, there may preferably be provision for the securing portion to be arranged at the side of the sliding wall remote from the storage space or below the sliding wall.

A vehicle according to the invention comprises at least one chassis, in particular a wheel-based chassis, and a storage space structure according to the invention which is arranged on the chassis. The vehicle may in particular be a trailer. An embodiment in the form of a motor vehicle is also possible.

BRIEF DESCRIPTION OF THE DRAWINGS

The invention is explained in greater detail below with reference to an embodiment which is illustrated in the drawings, in which.

DETAILED DESCRIPTION OF ILLUSTRATIVE EMBODIMENTS

The sliding wall system which is illustrated in the drawings comprises a sliding wall 1, a guide, along which the sliding wall 1 can be displaced, and a drive train. The sliding wall 1 comprises a carrier construction of rods and a panelling arrangement which is not illustrated in the drawings at a side of the carrier construction facing a storage space of the vehicle according to FIG. 11. The drive train is almost completely arranged inside the guide which is constructed as a guiding channel 2. The guiding channel 2 which has a rectangular cross-section is constructed so as to be fully closed, that is to say, all four sides of the guiding channel 2 which extend in the longitudinal direction are constructed so as to be closed by means of corresponding guiding wall elements. In this instance, the two lateral guiding wall elements 3 act as guide rails, in which a sliding guiding member 4 of the sliding wall 1 is displaceably guided.

In addition to the two lateral guiding wall elements 3, a lower guiding wall element 5 and an upper guiding wall element are further provided. The upper guiding wall element acts as a cover 6, which is connected only at the two ends thereof securely to the two lateral guiding wall elements 3. In contrast, the cover 6 which comprises, for example, a steel sheet, is positioned on the lateral guiding wall elements 3 between these ends with two guiding slots being formed, and can thereby be lifted therefrom locally with resilient deformation. This enables the sliding wall 1 which is arranged at a side of the cover 6 to be connected by means of a securing portion to components of the drive train which are arranged at the other side of the cover 6. To this end, the securing portion comprises a transverse carrier 7 which fixes both sliding guiding members 4 and which is guided between the cover 6 and the lateral guiding wall elements 3 and consequently within the guiding slots, and a securing component 8 which is connected to the transverse carrier 7 and which is located inside the guiding channel 2.

Figure 11:
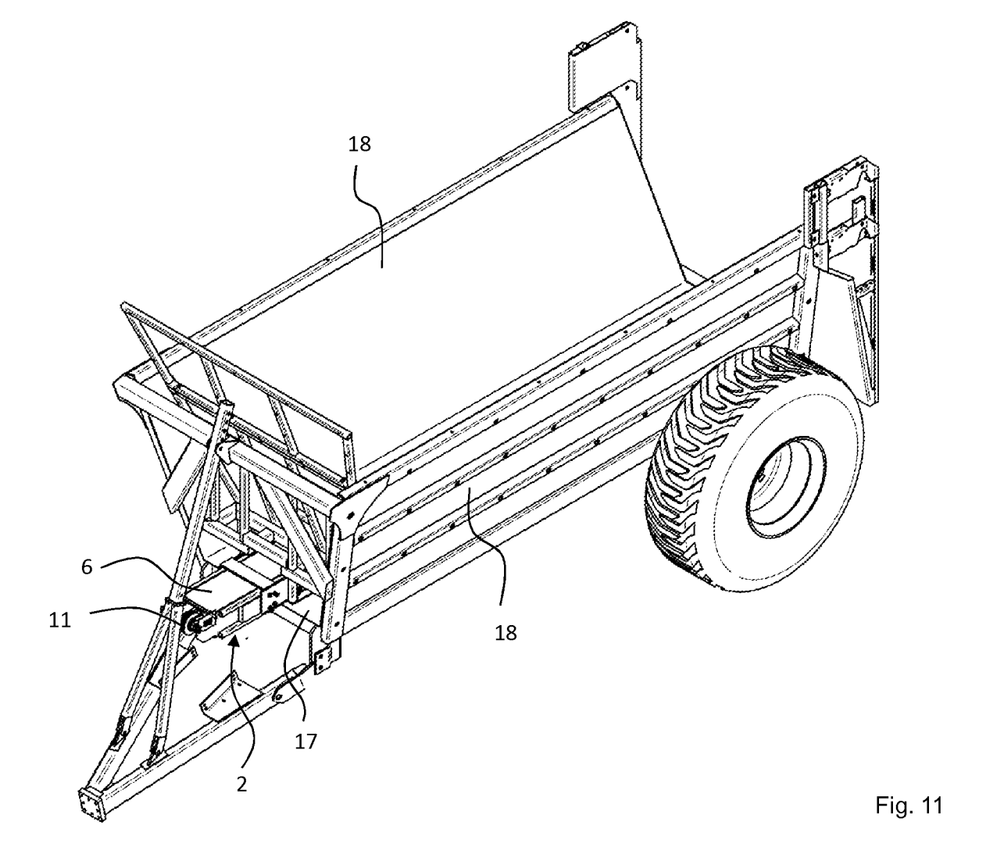
FIG. 11: shows a vehicle according to the invention with a sliding wall system according to FIGS. 1 to 10.

An end face of the guiding channel 2 is further also constructed so as to be closed. In this instance, it is the end which is arranged at the rear of the vehicle, which is illustrated in FIG. 11, which integrates the sliding wall system and which is constructed as a trailer. Only the end face of the guiding channel 2 which is arranged at the front of the vehicle is constructed to be open.

From this open end protrudes a portion of a cylindrical pipe 9 of a hydraulic or pneumatic drive cylinder 10 and a redirection roller 11 for a pulling means 12 which is secured to the free end of the cylindrical pipe 9 with a rotation axis which is orientated in the transverse direction of the vehicle. The drive cylinder 10 and the redirection roller 11 are portions of the drive train, which further comprises additional redirection rollers and a total of three pulling means.

Two first pulling means 13 are constructed as chains. These serve to transmit an extension movement of a piston rod 14 of the drive cylinder 10 to the sliding wall 1, wherein there is provision for a movement of the piston rod 14 to be translated with respect to the sliding wall 1 at ½, the sliding wall 1 is consequently moved at double the speed or twice as far as the piston rod 14. To this end, a first end of each of the chain-like first pulling means 13 is secured in the region of the open end of the guiding channel 2, whilst a second end of each second pulling means 13 is secured to the securing component 8 of the sliding wall 1. The first pulling means 13 which are guided parallel with each other are additionally guided via a redirection roller 15 which is rotatably supported on the head of the piston rod 14 so that, for each first pulling means 13, two strands 16 which are guided in a parallel manner are produced. The rather poor ratio of stroke to overall length of the drive cylinder 10, which is also substantially ½ with the drive cylinder 10 fully extended, is compensated for by the translation of the movement of the piston rod of ½. Consequently, the drive cylinder 10 with regard to the structural space can advantageously be integrated in the guiding channel 2 in such a manner that the head of the piston rod 14 in the fully retracted state of the drive cylinder 10 is arranged substantially at the centre of the provided displacement range of the sliding wall 1. The drive cylinder 10 thereby protrudes only with a relatively short portion from the guiding channel 2.

The displacement range extends from the front end of the storage space structure at the front of the vehicle according to FIG. 11 as far as the rear end of the storage space structure at the rear of the vehicle. The sliding wall 1 accordingly constitutes a front wall of the storage space structure. The storage space structure further comprises another floor 17 and two side walls 18. The sliding wall 1, the floor 17 and the side walls 18 delimit the storage space. The sliding wall 1 can be displaced along the floor 17 and the side walls 18 in the direction of an unloading opening which is formed at the rear of the vehicle. FIGS. 1 to 3, 5 and 11 show a first end position for the sliding wall 1, in which the storage space which is delimited in a variable manner by the sliding wall is largest. In the second end position with the drive cylinder fully extended (cf. FIGS. 6 to 9), the sliding wall 1 is in contrast located substantially directly at the unloading opening so that the storage space is minimal. In the vehicle according to FIG. 11, the unloading opening is formed as a result of a non-existent rear wall of the storage space structure. However, it is also possible to provide for a rear wall which is intended to be opened, for example, which can be pivoted upwards. The sliding wall 1 may serve to convey or push cargo which is stored in the storage space in the direction of and out of the unloading opening.

In order to convey the cargo out, considerable forces may be required. In order to apply these high forces, the drive cylinder 10 is advantageously suitable since it is distinguished—in comparison in particular with hydraulic or pneumatic rotary drives—by a high power to weight ratio and low costs. The forces required to convey the cargo are transmitted via the first two pulling means 13 from the piston rod 14 to the sliding wall 1. In this instance, the construction thereof as chains is advantageous with respect to the lengthenings which occur since chains can be produced in a simple and cost-effective manner with high longitudinal rigidity without this having a significantly negative effect on the capacity for redirection via the two redirection rollers 15.

Figure 1:
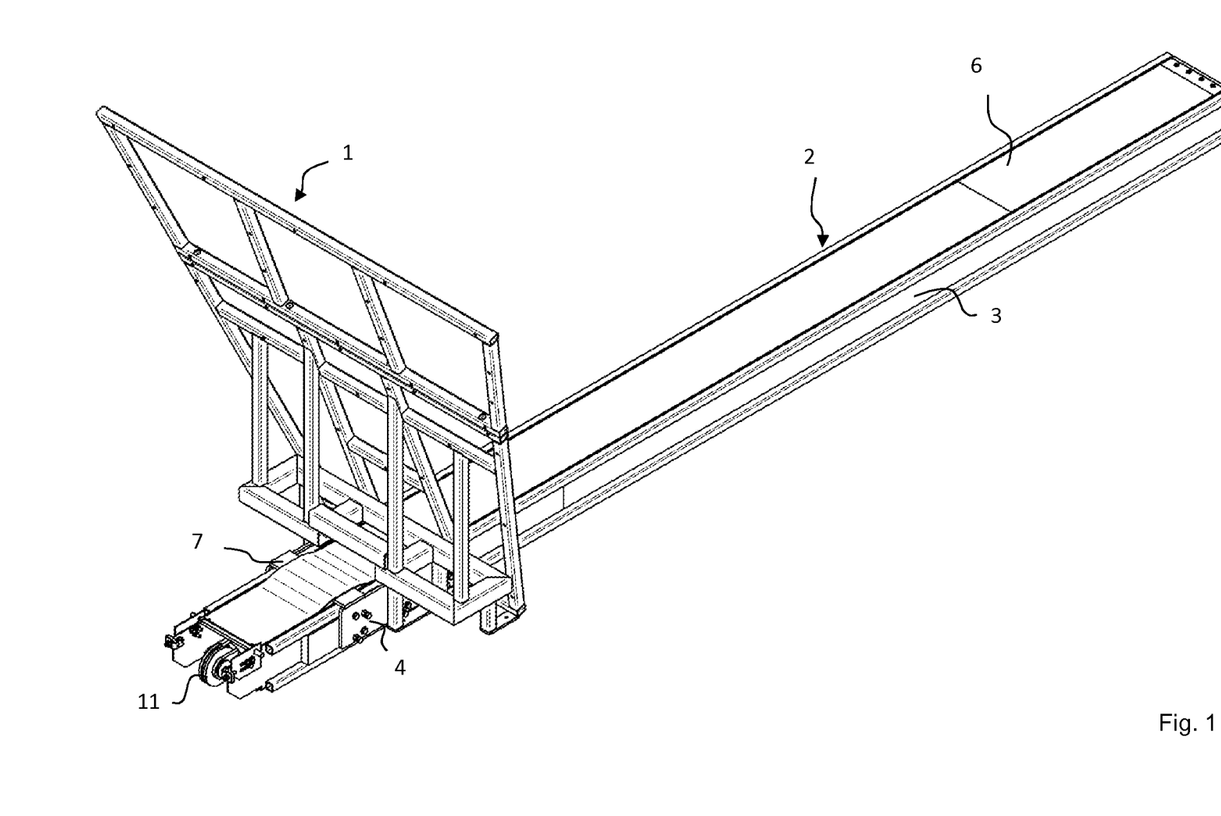
FIG. 1: is a perspective view of a sliding wall system according to the invention with the sliding wall in a first position.
Figure 2:
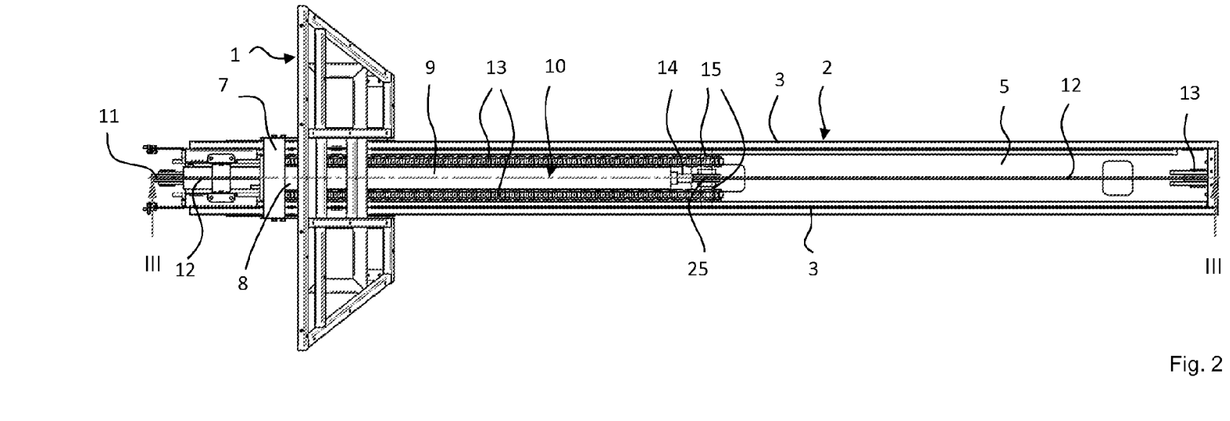
FIG. 2: is a plan view of the sliding wall system according to FIG. 1 (with the cover of the guide not being shown)
Figure 3:
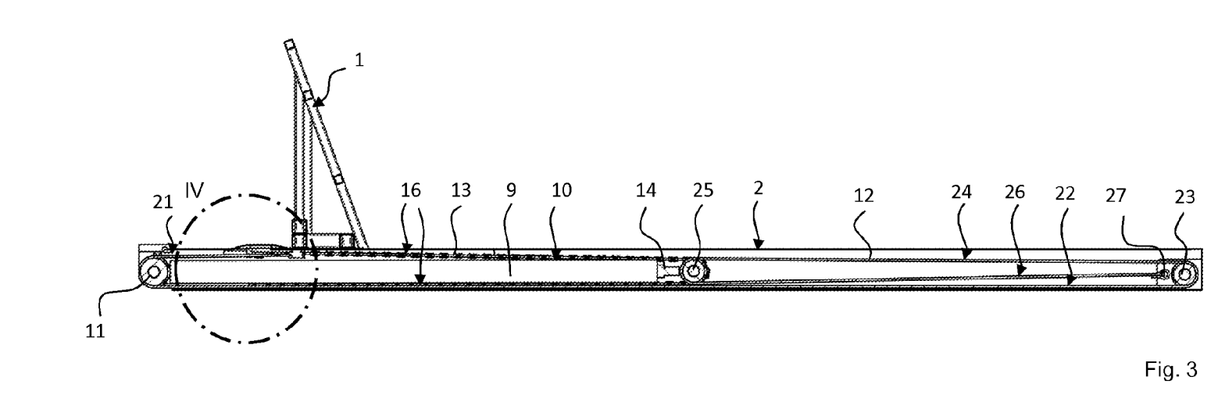
FIG. 3: is a longitudinal section through the sliding wall system in the plane of section III-III in FIG. 1.
Figures 4, 5:
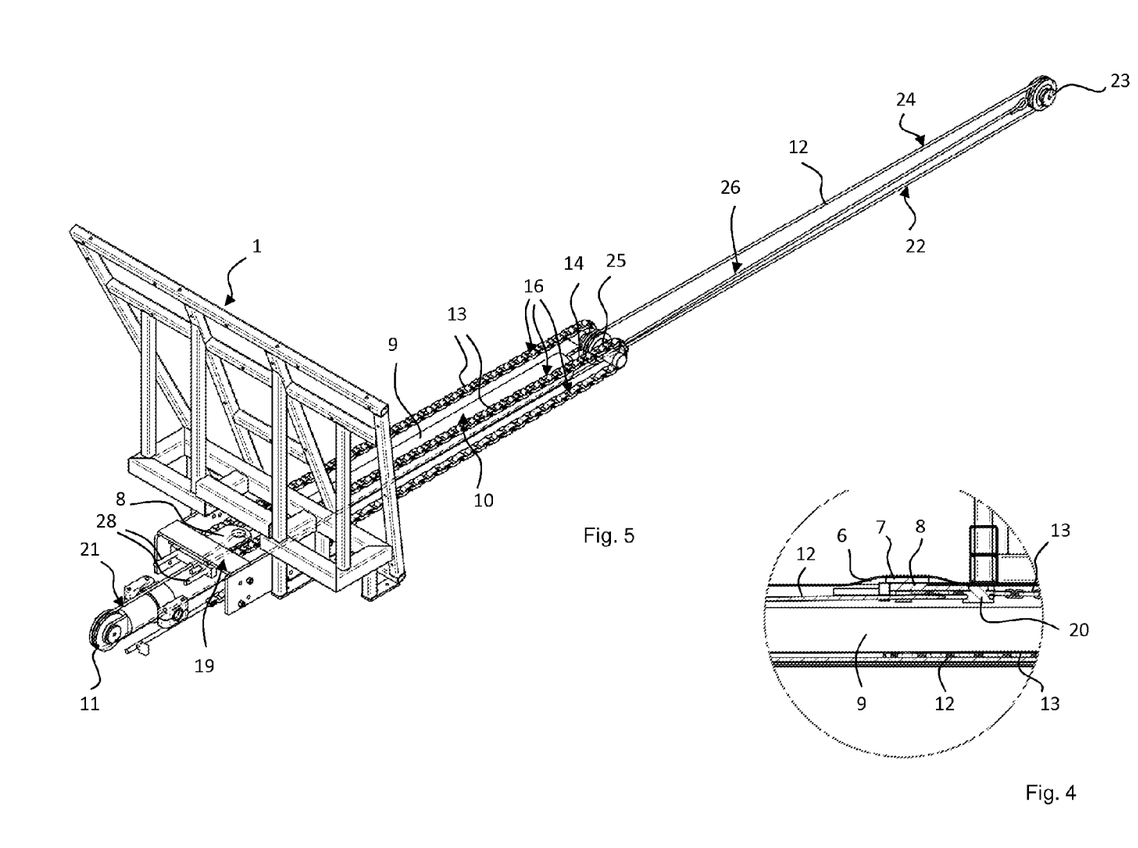
FIG. 4: is an enlarged illustration of the cut-out designated IV in FIG. 3.
FIG. 5: shows the sliding wall system according to FIG. 1 with the guide not being illustrated.
Figure 6:
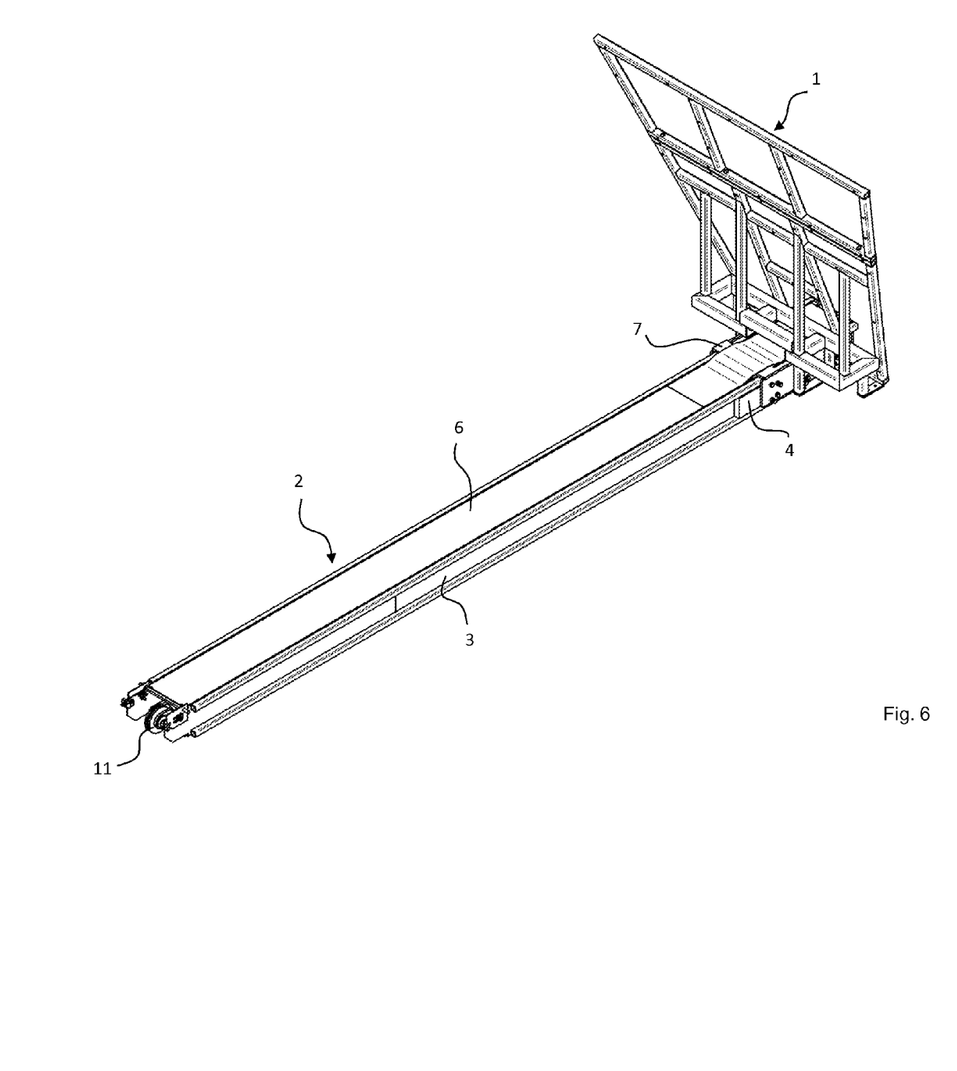
FIG. 6 is a perspective view of the sliding wall system with the sliding wall in a second position.
Figure 7:
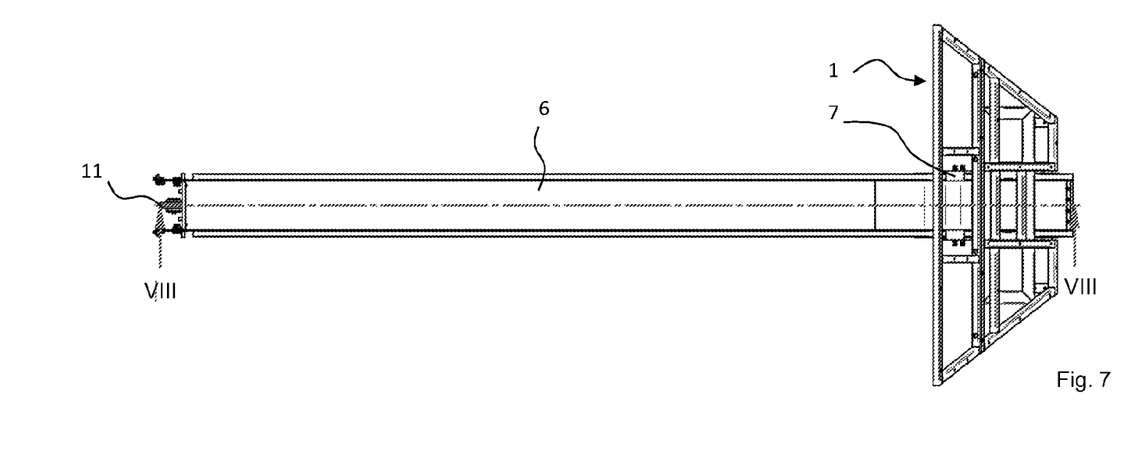
FIG. 7: is a plan view of the sliding wall system according to FIG. 6.
Figure 8:
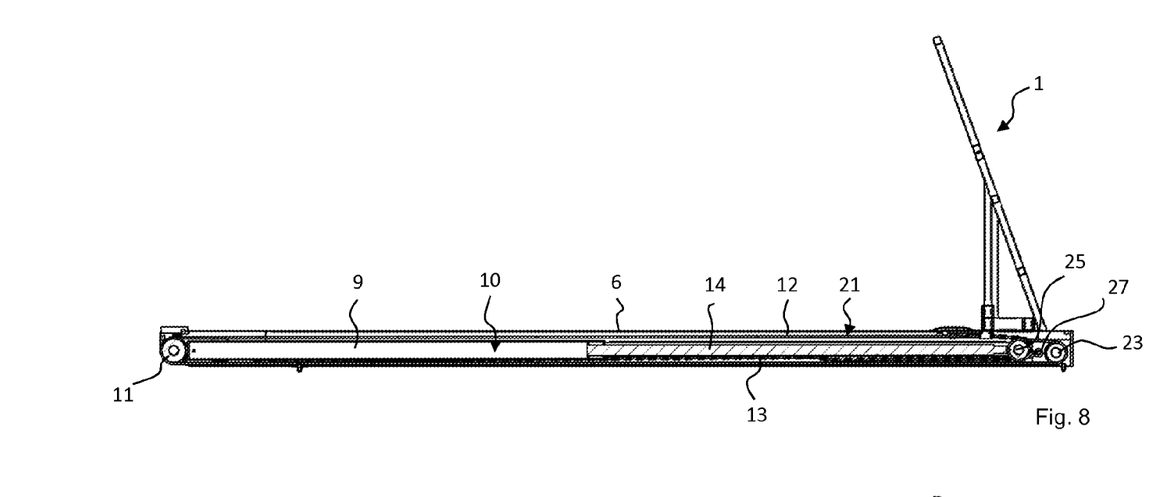
FIG. 8: is a longitudinal section through the sliding wall system in the plane of section VIII-VIII in FIG. 7.
Figures 9, 10:
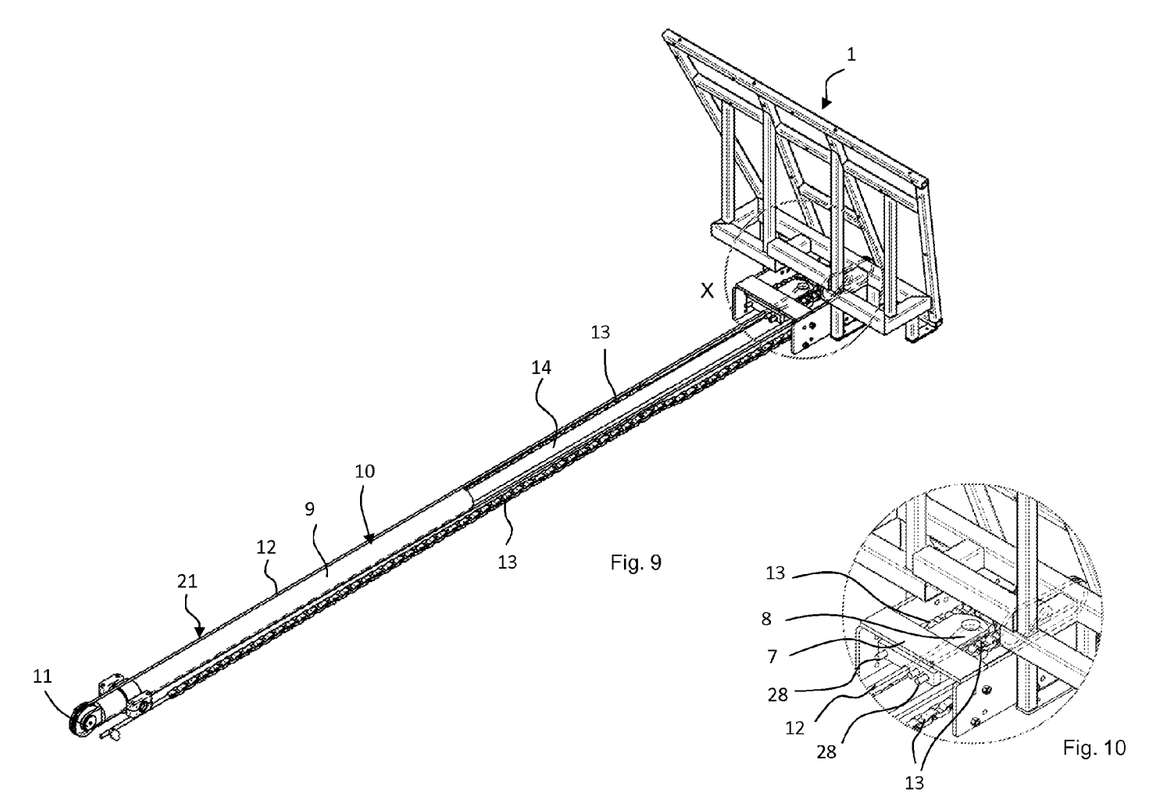
FIG. 9: shows the sliding wall system according to FIG. 6 with the guide not being illustrated.
FIG. 10: is an enlarged view of the cut-out designated X in FIG. 9.

As can be seen from a comparison, for example, of FIG. 5 and FIG. 9, when the drive cylinder 10 is extended, the strand 16 of the first two pulling means that extends between the end which is secured to the guiding channel 2 and the associated redirection roller 15 is extended by the stroke of the piston rod 14, whilst, at the same time, the other strand 15 is shortened by the stroke of the piston rod 14. The provided translation of the movement of the piston rod 14 with respect to the sliding wall 1 of ½ is thereby produced.

Whilst, when the drive cylinder 10 is extended, the movement or forces is/are transmitted via the two chain-like first pulling means 13, this is carried out when the drive cylinder 10 is retracted, whereby the sliding wall 1 is displaced from the rear of the vehicle or starting from the unloading opening in the direction of the front of the vehicle via a cable-like second pulling means 12. To this end, the second pulling means 12 is secured with a first end in the securing component 8 which also secures the first ends of the chain-like first pulling means 13, for example, by means of a clamping fixing. Starting from this location, a first strand 19 of the second pulling means 12 is guided to a first redirection roller 20 with an axis which is orientated in the vertical direction of the vehicle. This first redirection roller 20 is not rotatably driven when the sliding wall 1 is moved. A second strand 21 of the second pulling means 12 extends from the first redirection roller 20 as far as a second redirection roller 11 which is the redirection roller 11 which is arranged at the free end of the cylindrical pipe 9 of the drive cylinder 10 and consequently outside the guiding channel 2 and consequently the displacement range of the sliding wall 1. A third strand 22 of the second pulling means 12 extends from this second redirection roller 11 as far as a third redirection roller 23 which is arranged in the region of the rear of the vehicle outside the displacement range for the side wall 1 and also has a rotation axis which is orientated in the transverse direction of the vehicle. This third strand 22 accordingly extends between two redirection rollers 11, 23 which are securely integrated in the guide of the sliding wall system so that the length thereof does not change in the context of the movement of the sliding wall. A fourth strand 24 of the second pulling means 12 extends from the third redirection roller 23 as far as a fourth redirection roller 25 which is arranged between the two redirection rollers 15 for the chain-like first pulling means 13 on the head of the piston rod 14 of the drive cylinder 10. A fifth strand 26 finally extends from the fourth redirection roller 25 as far as a securing element 27 for the corresponding end of the second pulling means 12 which is arranged shortly before the third redirection roller 23.

Figure 12:
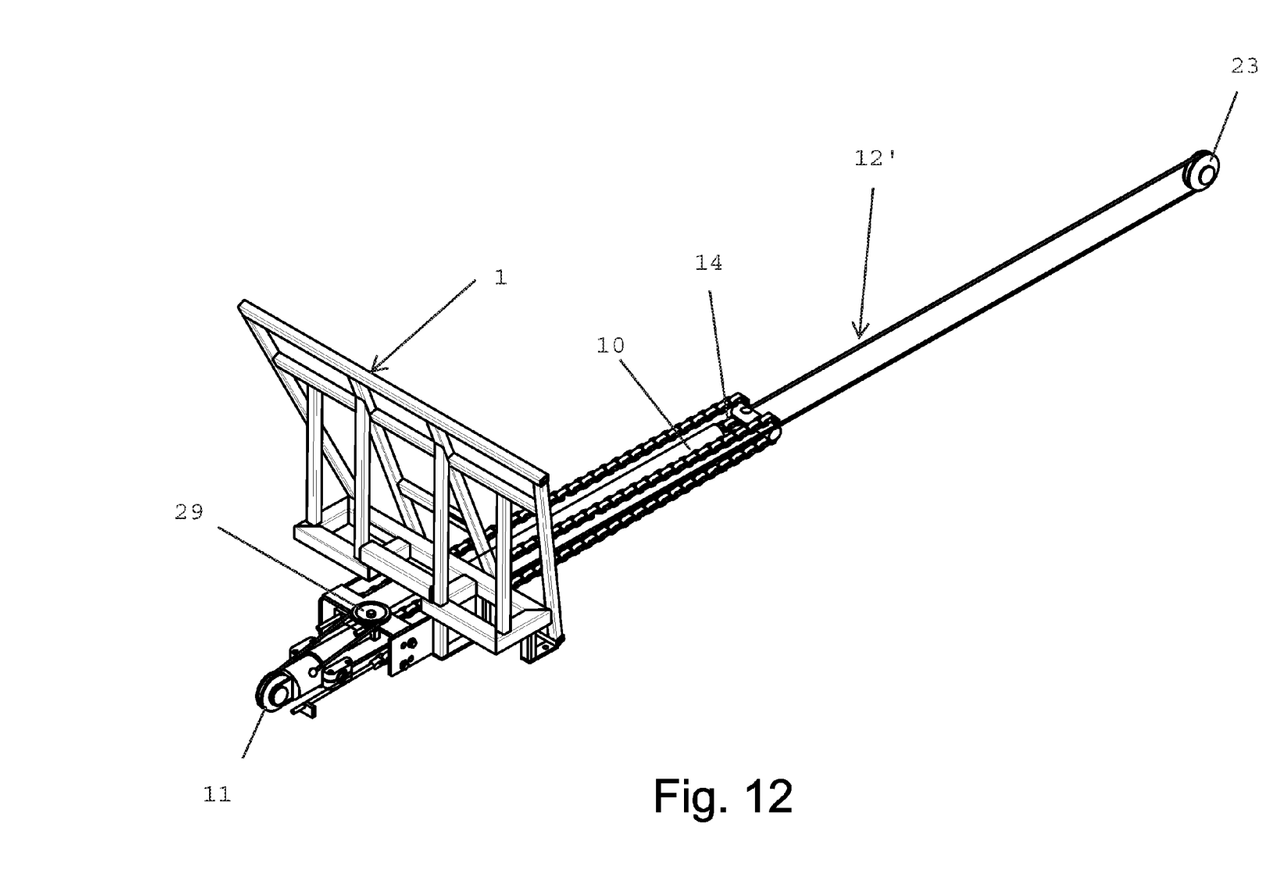
FIG. 12: shows the sliding wall system similar to FIG. 5, but showing the second pulling means guided via two redirection rollers arranged outside the displacement range of the sliding wall, wherein the second pulling means is further secured to the movable portion of the drive cylinder and guided via a redirection member which is arranged on the sliding wall.

An alternative structure is provided in FIG. 12, wherein the second pulling means 12' is guided via the two redirection members 11, 23 (in particular redirection rollers) which are arranged outside the displacement range of the sliding wall 1. The second pulling means 12' is further secured to the movable portion (piston rod 14) of the drive cylinder 10 and guided via a redirection member 29 which is arranged on the sliding wall 1.

When the drive cylinder 10 is retracted, both the fifth strand 26 and the fourth strand 24 are extended by a travel path corresponding to the stroke of the piston rod 14, whereby the desired translation of the movement of the piston rod 14 with respect to the sliding wall 1 of ½ is achieved. Since, with a movement of the sliding wall 1 from the unloading opening, no cargo has to be moved, the forces which are required for this are comparatively small. For this reason, the second pulling means 12 may be constructed in a cost-effective manner as a cable. A relatively large extensibility of the cable-like second pulling means 12, which in particular together with the relatively large length of this pulling means 12, as a result of the multiple redirection, could lead to a great lengthening, does not present a problem as a result of these comparatively small forces.

In the sliding system, there is consequently provision, when the drive cylinder 10 is extended, for the movement/forces to be transmitted via the chain-like first pulling means 13 to the sliding wall 1, whilst the cable-like second pulling means 12 is carried in an unloaded state, that is to say, without being loaded by drive forces. When the drive cylinder 10 is retracted, the reverse is true.

In order to be able to produce the most direct possible transmission of the movement of the piston rod 14 to the sliding wall 1, the pulling means 12, 13 are intended to be pretensioned with at least low tension. To this end, a clamping device is provided for each of the chain-like first pulling means 13. This clamping device comprises a threaded rod 28 which is connected to an end of the respective first pulling means 13 and which is screwed into a threaded opening of the securing component 8, which enables a positional change of the corresponding end and consequently a clamping of the associated first pulling means 13. For the cable-like second pulling means 12, no such clamping device is provided. A clamping of the second pulling means 12 is instead enabled by the clamping and thereby stepless fixing of one end of the second pulling means 12 (held under tension during assembly) in the securing component 8 of the sliding wall 1.

LIST OF REFERENCE NUMERALS

1. Sliding wall
2. Guiding channel
3. Lateral guiding wall elements
4. Sliding guiding member
5. Lower guiding wall element
6. Cover
7. Transverse carrier of the securing portion
8. Securing component of the securing portion
9. Cylindrical pipe
10. Drive cylinder
11. Second redirection roller for the second tensile element
12. Second pulling means
13. First pulling means
14. Piston rod
15. Redirection roller for the first pulling means
16. Strand of the first pulling means
17. Floor of the storage space structure
18. Side wall of the storage space structure
19. First strand of the second pulling means
20. First redirection roller for the second pulling means
21. Second strand of the second pulling means
22. Third strand of the second pulling means
23. Third redirection roller for the second pulling means
24. Fourth strand of the second pulling means
25. Fourth redirection roller for the second pulling means
26. Fifth strand of the second pulling means
27. Securing element for the second pulling means
28. Threaded rod

The invention claimed is:

1. A storage space structure having a floor and a sliding wall system, wherein the sliding wall can be moved along the floor, the sliding wall system having a guide, a sliding wall and a drive for displacing the sliding wall along the guide, the drive comprising a drive cylinder, a first pulling means and a second pulling means, wherein a movement of a movable portion of the drive cylinder in a first movement direction, in which the sliding wall is displaced in the direction of an unloading opening, is transmitted to the sliding wall via the first pulling means and wherein a movement of the movable portion of the drive cylinder in a second movement direction is transmitted to the sliding wall via the second pulling means; a first end of the first pulling means being secured to the sliding wall and a second end being secured to the guide, wherein the first pulling means is guided via a redirection member which is arranged on the movable portion of the drive cylinder, such that a first strand of the first pulling means extends directly from the first end to the redirection member and a second strand of the first pulling means extends directly from the redirection member to the second end, characterised in that the second pulling means is guided via first and second redirection members which are arranged outside the displacement range of the sliding wall, wherein the second pulling means is further secured to the movable portion of the drive cylinder and guided via a redirection member which is arranged on the sliding wall.

2. The storage space structure according to claim 1, characterised in that the first pulling means is constructed as a chain and the second pulling means is constructed as a cable.

3. The storage space structure according to claim 1, characterised in that the first pulling means and the second pulling means extend in planes which are arranged in a parallel manner.

4. The storage space structure according to claim 1, characterised by two first pulling means, wherein the second pulling means is arranged between the first two pulling means with respect to the direction transverse to the movement directions of the sliding wall.

5. The storage space structure according to claim 1, characterised by a clamping device for the first pulling means and/or the second pulling means.

6. The storage space structure according to claim 1, characterised in that the guide is constructed as a guiding channel, wherein the drive cylinder and the first pulling means or the second pulling means or both the first pulling means and second pulling means are arranged at least partially inside the guiding channel.

7. The storage space structure according to claim 1, characterised in that the guide has a guiding slot, wherein a securing portion for the sliding wall extends through the guiding slot, wherein a connection of the first pulling means and the second pulling means to the securing portion is located on a side of a guiding face of the guide that faces away from the sliding wall.

8. The-storage space structure according to claim 7, characterised in that the guiding slot is formed between the guiding face which is constructed as a resiliently deformable cover and another element of the guide, wherein the cover is locally lifted from the other element by the securing portion.

9. The storage space structure according to claim 1, characterised in that the sliding wall can be displaced along a side wall.

10. A vehicle having a chassis and a storage space structure which is arranged on the chassis according to claim 1.

* * * * *